(12) United States Patent
Loraing et al.

(10) Patent No.: US 11,921,093 B2
(45) Date of Patent: Mar. 5, 2024

(54) MOUNTING A SAMPLE SEPARATION UNIT BY A SWIVEL MECHANISM

(71) Applicant: Agilent Technologies, Inc., Santa Clara, CA (US)

(72) Inventors: Daniela Loraing, Karlsruhe (DE); Lena Höninger, Karlsruhe (DE); Uwe Effelsberg, Karlsruhe (DE); Andreas Otto, Waldbronn (DE); Ansgar Waldbaur, Karlsruhe (DE); Armin Steinke, Ettlingen (DE); Thomas Ortmann, Straubenhardt/Ottenhausen (DE); Michael Lang, Baden-Wuttemberg (DE)

(73) Assignee: Agilent Technologies, Inc., Santa Clara, CA (US)

( * ) Notice: Subject to any disclaimer, the term of this patent is extended or adjusted under 35 U.S.C. 154(b) by 233 days.

(21) Appl. No.: 17/584,250

(22) Filed: Jan. 25, 2022

(65) Prior Publication Data
US 2022/0236235 A1 Jul. 28, 2022

(30) Foreign Application Priority Data
Jan. 27, 2021 (GB) .................................... 2101086

(51) Int. Cl.
*G01N 30/60* (2006.01)
(52) U.S. Cl.
CPC .............................. *G01N 30/6047* (2013.01)

(58) Field of Classification Search
CPC .... G01N 30/6047; G01N 30/06; G01N 30/74; G01N 30/6004
See application file for complete search history.

(56) References Cited

U.S. PATENT DOCUMENTS

| | | | |
|---|---|---|---|
| 4,089,207 A | 5/1978 | Patton | |
| 10,338,038 B2* | 7/2019 | Kirby | ..................... B01D 15/10 |
| 2019/0317061 A1* | 10/2019 | Nakagawa | ......... G01N 30/6047 |
| 2021/0333247 A1* | 10/2021 | Ortmann | ................ G01N 30/18 |
| 2021/0341437 A1* | 11/2021 | Leveille | ............. G01N 30/6047 |

FOREIGN PATENT DOCUMENTS

| | | | | |
|---|---|---|---|---|
| CN | 219369669 U | * | 7/2023 | |
| EP | 990899 A1 | * | 4/2000 | ............. G01N 30/22 |
| JP | H04194749 A | | 7/1992 | |
| JP | H11316218 A | | 11/1999 | |

* cited by examiner

*Primary Examiner* — Francis C Gray (57) ABSTRACT

A mounting device for mounting a sample separation unit configured for separating, preferably chromatographically separating, compounds in a fluidic sample includes a first fluid connector configured for being mechanically and fluidically coupled with a first fluid interface of the sample separation unit, a second fluid connector configured for being mechanically and fluidically coupled with a second fluid interface of the sample separation unit, and a swivel mechanism configured for swivelling the first fluid connector between a mounting orientation for mounting the first fluid interface of the sample separation unit at the first fluid connector and an alignment orientation for aligning the second fluid interface of the mounted sample separation unit with the second fluid connector for subsequently coupling the second fluid interface with the second fluid connector.

20 Claims, 3 Drawing Sheets

MOUNTING A SAMPLE SEPARATION UNIT BY A SWIVEL MECHANISM

RELATED APPLICATIONS

This application claims priority to UK Application No. GB 2101086.3, filed Jan. 27, 2021, the entire contents of which are incorporated herein by reference.

TECHNICAL FIELD

The present invention relates to a mounting unit, to a sample separation apparatus, and to a method of mounting a sample separation unit.

BACKGROUND ART

In liquid chromatography, a fluid (such as a mixture between a fluidic sample and a mobile phase) may be pumped through conduits and a column comprising a material (stationary phase) which is capable of separating different components of the fluidic sample. Such a material, so-called beads which may comprise silica gel, may be filled into a column which may be connected to other elements (like a sampling unit, a flow cell, containers including sample and/or buffers) by conduits.

During a separation process, it may be necessary or desirable to bring the column to a desired temperature. For this purpose, the column is mounted in a column oven and heated there. Mounting a column in a column oven is often uncomfortable for a user. During such an assembly, a user must conventionally handle small and sensitive components, such as capillaries and fittings, and couple them with the column fluidically. This is a delicate activity that cannot be easily accomplished by a user without special expertise.

SUMMARY

It is an object of the invention to enable a simple and reliable mounting of a sample separation unit.

According to an exemplary embodiment of the present invention, a mounting device for mounting a sample separation unit configured for separating, preferably chromatographically separating, compounds in a fluidic sample (which may also be denoted as sample fluid) is provided, wherein the mounting device comprises a first fluid connector configured for being mechanically and fluidically coupled with a first fluid interface (such as an inlet) of the sample separation unit, a second fluid connector configured for being mechanically and fluidically coupled with a second fluid interface (such as an outlet) of the sample separation unit, and a swivel mechanism (which may also be denoted as a pivoting mechanism) configured for swivelling (or pivoting) the first fluid connector between a mounting orientation (in particular of the swivel mechanism, the first fluid connector, the sample separation unit and/or the mounting device) for mounting the first fluid interface of the sample separation unit at the first fluid connector and an alignment orientation (in particular of the swivel mechanism, the first fluid connector, the sample separation unit and/or the mounting device) for aligning the second fluid interface of the mounted sample separation unit with the second fluid connector for subsequently coupling the second fluid interface with the second fluid connector.

According to another exemplary embodiment of the present invention, a sample separation apparatus for separating a fluidic sample is provided, wherein the sample separation apparatus comprises a fluid drive unit configured for driving a mobile phase and the fluidic sample injected in the mobile phase, a sample separation unit configured for separating the fluidic sample, and a mounting device having the above-mentioned features for mounting the sample separation unit at the sample separation apparatus.

According to still another exemplary embodiment, a method of mounting a sample separation unit configured for separating, preferably chromatographically separating, compounds in a fluidic sample is provided, wherein the method comprises mounting a first fluid interface of the sample separation unit at a first fluid connector in a mounting orientation to couple the first fluid connector mechanically and fluidically with the first fluid interface of the sample separation unit, thereafter swivelling a swivel mechanism from the mounting orientation to an alignment orientation for aligning a second fluid interface of the sample separation unit with a second fluid connector, and, in the alignment orientation, coupling the second fluid connector mechanically and fluidically with the second fluid interface of the sample separation unit.

In the context of the present application, the term "fluid connector" may particularly denote a member which is provided for forming a fluidic (and in particular fluid-tight, more particularly high-pressure tight) connection with an inlet or outlet of the sample separation unit. In particular, such a fluid connector may be embodied as a fitting.

In the context of the present application, the term "fluid interface" may particularly denote an inlet section or an outlet section of a sample separation unit such as a chromatographic separation column. Such a fluid interface can be adapted for establishing a fluidic connection with a fluid connector of the mounting device.

In the context of the present application, the term "mechanically and fluidically coupling" may particularly denote establishing a connection between a respective fluid connector and a respective fluid interface in which a fluid communication between the fluid connector and the sample separation unit is established.

In the context of the present application, the term "swivelling the first fluid connector" may particularly denote an action of pivoting a pivot-mounted first fluid connector (in particular together with a sample separation unit mounted on the first fluid connector) between predefined orientations, in particular a mounting orientation and an alignment orientation. Preferably, the sample separation unit may be connected with the first fluid connector and may function as a rotation lever during such a swivelling operation.

In the context of the present application, the term "mounting orientation" may particularly denote a defined angular orientation (which may be different from the alignment or analysis orientation) in which the first fluid connector is accessible to a user so that the user can conveniently (preferably without the use of tools, i.e. in a tool-free manner) mount a sample separation unit on the first fluid connector in the mounting orientation or remove a sample separation unit mounted on the first fluid connector from the mounting device. In the mounting orientation it may be possible that a sample separation unit mounted at the mounting device is not yet coupled with both its fluid interfaces at both fluid connectors of the mounting device for fluid communication or even in a fluid-tight way. This allows a user in the mounting orientation to insert a sample separation unit into the mounting device or remove it from the mounting device. In an embodiment, the first fluid connector may be biased (for instance in view of the own weight force of the fluid connector, and/or by a biasing unit such as a biasing spring or biasing magnets) in the mounting orientation, i.e. may be present in the mounting orientation in the absence of exterior forces. As a result, the mounting orientation may be the default orientation of the mounting device.

In the context of the present application, the term "alignment orientation" may particularly denote a defined angular orientation (which may be different from the mounting orientation) in which the first fluid connector and a sample separation unit mounted on the first fluid connector are aligned with the second fluid connector. In particular, said alignment may be so that a subsequent predefined or guided (in particular longitudinal) motion of the second fluid connector towards the first fluid connector with assembled sample separation unit, or vice versa, may bring the arrangement of the fluid connectors and the sample separation unit into an analysis or separation configuration in which a sample separation process using the sample separation unit may be carried out. When in the alignment orientation, the first fluid connector and the sample separation unit may be in an orientation (and preferably also at a position) in which the first fluid connector and the sample separation unit are readily prepared for sample separation or analysis.

In the context of the present application, the term "sample separation apparatus" may particularly denote an apparatus which is configured for separating a fluidic sample, for instance into different fractions. In particular, the sample separation apparatus may be a chromatography apparatus. When the fluidic sample is supplied to the sample separation apparatus and is injected by an injector into a separation path between fluid drive unit and sample separation unit, different physical, chemical and/or biological properties of different fractions of the fluidic sample may result in a separation of the different fractions in the sample separation unit.

In the context of this application, the term "fluidic sample" (or sample fluid) may particularly denote any liquid and/or gaseous medium, optionally including also solid particles, which is to be separated. Such a fluidic sample may comprise a plurality of different molecules or particles which shall be separated, for instance small mass molecules or large mass biomolecules such as proteins. Separation of a fluidic sample may involve a certain separation criterion (such as mass, volume, chemical properties, etc.) according to which a separation is carried out.

In the context of this application, the term "mobile phase" may particularly denote any liquid and/or gaseous medium which may serve as fluidic carrier of the fluidic sample during separation. A mobile phase may be a solvent or a solvent composition (for instance composed of water and an organic solvent such as ethanol or acetonitrile). In an isocratic separation mode of a liquid chromatography apparatus, the mobile phase may have a constant composition over time. In a gradient mode, however, the composition of the mobile phase may be changed over time, in particular to desorb fractions of the fluidic sample which have previously been adsorbed to a stationary phase of a sample separation unit.

In the context of the present application, the term "fluid drive unit" may particularly denote an entity capable of driving a fluid (i.e. a liquid and/or a gas, optionally comprising solid particles), in particular the fluidic sample and/or the mobile phase. For instance, the fluid drive may be a pump (for instance embodied as piston pump or peristaltic pump) or another source of pressure. For instance, the fluid drive unit may be a high-pressure pump, for example capable of driving a fluid with a pressure of at least 100 bar, in particular at least 1000 bar.

The term "sample separation unit" may particularly denote a fluidic member through which a fluidic sample is transferred, and which is configured so that, upon conducting the fluidic sample through the separation unit, the fluidic sample will be separated into different groups of molecules or particles. An example for a separation unit is a liquid chromatography column which is capable of trapping or retarding and selectively releasing different fractions of the fluidic sample. In particular, a sample separation unit may be a tubular body with an aspect ratio (i.e. a ratio between length and diameter) of more than one, in particular of more than two, for instance even at least three. For instance, a length of a sample separation unit may be in a range from 80 mm to 300 mm, for example 100 mm.

According to an exemplary embodiment, a mounting device for establishing a user-friendly and at the same time reliable mechanical and fluidic connection of a sample separation unit, for example embodied as a chromatography separation column, is provided. With such a mounting device, after mounting of the sample separation unit on a first fluid connector in an angular mounting orientation by a user, an intuitive swivelling of the first fluid connector together with the sample separation unit may be carried out to swivel or pivot the sample separation unit from the mounting orientation to an alignment orientation in which the first fluid connector and the sample separation unit are pre-aligned with a second fluid connector for being fluidically coupled with the second fluid connector to render the sample separation apparatus ready for sample analysis or separation. Hence, the mounting orientation may correspond to an access position and orientation of the first fluid connector and the sample separation unit, whereas the alignment orientation may correspond to an analysis position and orientation of the sample separation unit. Advantageously, the first fluid connector may be presented to the user in the mounting orientation for enabling an anatomically favorable assembly of the sample separation unit in a user convenient way. An intuitive and simple swivelling motion of the sample separation unit together with the first fluid connector may then convert them into the alignment orientation in which they are aligned with a second fluid connector. Assembly of the sample separation unit in the mounting device may then be completed by approaching second fluid connector and sample separation unit towards each other. The second fluid connector can be connected for example manually or in an automated way, for instance by a mechanic mechanism (for example a knee lever), a motorized mechanism, a hydraulic mechanism, and/or a pneumatic device. Such an assembly process is simple and failure robust. In a preferred embodiment, the mere swivelling transfer of the sample separation unit into the alignment orientation may simultaneously lead to a sealed (preferably high-pressure sealed) fluid coupling between the sample separation unit and the first fluid connector of the mounting device. Descriptively speaking, the sample separation unit itself may function as a swivelling lever operating a sealing eccentric or the like merely triggered by the swivelling action. A user does not need to do anything else besides mounting the sample separation unit on the first fluid connector and executing the intuitive swivelling action in order to prepare the sample separation unit for a subsequent completion of its fluid coupling with the second fluid connector. This allows even a user without special expertise to execute a reliable assembly of the sample separation unit in the sample separation apparatus. A time-consuming, delicate and error-prone handling of capillaries or the like as well as their connection to the sample separation unit may be dispensable using a mounting device according to an exemplary embodiment of the invention. Consequently, a fast, failure-robust and user-friendly assembly of the sample separation unit in the sample separation apparatus may be made possible by the mounting device. After the assembly of the sample separation unit at the mounting device, due to the reliably formed fluid coupling of the sample separation unit in the sample separation apparatus, a precise separation result can be obtained. Moreover, column holders may become dispensable, as well as the handling and connection of capillaries and tools by a user.

In the following, further embodiments of the mounting device, the sample separation apparatus, and the method will be explained.

In an embodiment, the first fluid connector is a conical fluid connector for insertion into the first fluid interface of the sample separation unit. Additionally or alternatively, the second fluid connector may be a conical fluid connector for insertion into the second fluid interface of the sample separation unit. More generally, any of the first fluid connector and the second fluid connector may be a male fluid connector. Such a male fluid connector may cooperate with a respective female fluid interface of the sample separation unit.

In an embodiment, at least one of the first fluid connector and the second fluid connector is configured to be movable towards the respectively other fluid connector for coupling the second fluid interface of the sample separation unit with the second fluid connector in the alignment orientation. In particular, the first fluid connector may be longitudinally stationary, whereas the second fluid connector may be moved along a defined longitudinal axis. The configuration with at least one movable fluid connector may allow to adjust the distance between the fluid connectors in accordance with a length of a sample separation unit to be mounted. This may make it possible to use one and the same mounting device with different sample separation units which can be freely selected over a large range of length values. For instance, the mounting device may be configured for supporting sample separation units at least from a range of length values from 30 mm to 300 mm (for example length values of 30 mm, 50 mm, 80 mm or 100 mm are possible). This may increase the flexibility of the user to use a universal mounting device.

In an embodiment, the at least one movable of the first fluid connector and the second fluid connector is connected with a longitudinal guide unit for being movable (in particular for being slid) in a guided way along a longitudinal motion direction, in particular along a rail. For instance, the rail may arranged to be coaxial with or parallel to the sample separation unit. Correspondingly, the process of coupling the second fluid connector mechanically and fluidically with the second fluid interface in the alignment orientation may comprise sliding or pushing the second fluid connector onto the second fluid interface. For example, the distance between the fluid connectors may be freely adjusted in a continuous way or in a stepped way.

In an embodiment, the alignment orientation is parallel to the longitudinal motion direction. Moreover, the mounting orientation may be slanted with respect to the longitudinal sliding direction. Hence, when the sample separation unit and the first fluid connector are in the alignment orientation, the extension direction of the sample separation unit may correspond to the longitudinal motion direction which enables a fluid coupling between the second fluid connector and the second fluid interface merely by a longitudinal motion. In contrast to this, no such fluid coupling may be enabled in the slanted mounting orientation.

In an embodiment, the mounting device comprises a fixing mechanism for fixing the at least one movable one of the first fluid connector and the second fluid connector by operating the fixing mechanism. In particular, the process of coupling the second fluid connector mechanically and fluidically with the second fluid interface may comprise, after the sliding, spatially fixing the second fluid connector. When fixed, the second fluid connector is immobilized at a certain position and at a distance to the first fluid connector which corresponds to a length of the implemented sample separation unit. In an embodiment, fixing the movable second fluid connector may be a prerequisite for subsequently establishing a sealed connection (in particular a high pressure resistant connection) between the second fluid interface of the sample separation unit and the second fluid connector.

In an embodiment, the fixing mechanism comprises a fixing lever. Actuating a fixing lever is an intuitive and simple way for a user of fixing the respective fluid connector at the respective fluid interface of the sample separation unit. However, other mechanical solutions for the fixing mechanism are possible, such as a fixing button which may be pressed by the user for fixing the respective fluid connector. Also an automated connection mechanism is possible.

In an embodiment, the fixing lever has or is coupled with a fixing eccentric configured for fixing the at least one movable one of the first fluid connector and the second fluid connector by turning the fixing lever. Highly advantageously, merely pivoting or turning a fixing lever with a connected fixing eccentric may trigger a reliable mechanical fixing force immobilizing the respective fluid connector at a user-defined position. Descriptively speaking, a thick portion of the fixing eccentric may press onto the fluid connector to be fixed when the user actuates the fixing lever.

In an embodiment, the swivel mechanism comprises a hinge. A hinge may be a mechanical bearing that connects two solid objects and may allow only a limited angle of rotation between them along only one defined rotation axis. Thus, the swivel mechanism may enable the user to exclusively swivel the first fluid connector only around one pre-defined swivelling axis. This may avoid an erroneous operation of the mounting device and may therefore ensure a failure robust operation thereof.

In a preferred embodiment, the first fluid connector is configured for being fluidically coupled with the first fluid interface of the sample separation unit in a sealed, in particular high pressure resistant, way by swivelling the sample separation unit from the mounting orientation to the alignment orientation. Highly advantageously, the action of transferring the first fluid connector from the mounting orientation to the alignment orientation (wherein the latter may correspond to an analysis orientation) may simultaneously and without taking any further measure establish a fluid tight sealed connection between the first fluid connector of the mounting device and the first fluid interface of the sample separation unit. Preferably, such a sealed configuration may be high pressure resistant, i.e. may disable fluid leakage even in the scenario of a high-pressure of fluid flowing through the first fluid connector into the first interface of the sample separation unit. For example, the sealed configuration may be capable of withstanding a high-pressure of in particular at least 600 bar, more particularly at least 1200 bar. Hence, the sealed connection may be compatible with the requirements of liquid chromatography, in particular UHPLC.

In particular, the first fluid connector may be located downstream of an injector by which a fluidic sample to be separated is injected in a mobile phase between fluid drive unit and sample separation unit. Optionally, a preheater assembly may be arranged between the injector and the first fluid connector for preheating fluidic sample and/or mobile phase before reaching the sample separation unit. In yet another embodiment, a preheater assembly may be integrated in the first fluid connector. Hence, fluidic sample and/or mobile phase may be at or may be brought to a high-pressure when reaching the first fluid connector or while passing the first fluid connector, said high-pressure being provided by the fluid drive unit such as a piston pump. While passing the sample separation unit, a significant pressure drop may occur, for instance from 1200 bar or more at the first fluid interface up to 30 bar or less at the second fluid interface. Consequently, a high performance sealing performance may be of utmost advantage at the first fluid connector.

In an embodiment, the mounting device comprises a first sealing mechanism with a first sealing eccentric configured for being swivelled by swivelling the sample separation unit from the mounting orientation to the alignment orientation to thereby fluidically couple the first fluid connector with the first fluid interface of the sample separation unit in a sealed, in particular high pressure resistant, way. Correspondingly, the method may comprise fluidically coupling the first fluid connector with the first fluid interface of the sample separation unit in a sealed, in particular high pressure resistant, way by swivelling the sample separation unit from the mounting orientation to the alignment orientation. In an embodiment, the mounting device may be configured so that swivelling the first fluid connector with the sample separation unit from the mounting orientation to the alignment orientation triggers formation of a sealed, in particular high pressure resistant, connection between the first fluid interface and the first fluid connector, in particular by a first sealing eccentric. Accordingly, the method may comprise actuating a first sealing eccentric by swivelling the sample separation unit from the mounting orientation to the alignment orientation to thereby fluidically couple the first fluid connector with the first fluid interface of the sample separation unit in a sealed, in particular high pressure resistant, way. Descriptively speaking, a for instance column-shaped sample separation unit itself may function as a sealing lever being transferred from the mounting orientation to the alignment orientation to thereby act on the first sealing eccentric for pressing, with a broad portion thereof, the first fluid connector together with the first fluid interface of the sample separation unit. Therefore, no separate action may be necessary for a user for establishing a high pressure resistant connection between the first fluid connector and the sample separation unit apart from intuitively swivelling the first fluid connector together with the sample separation unit from the mounting orientation of the alignment orientation. Descriptively speaking, a column-shaped sample separation unit may be operated as a fixing lever which only needs to be tilted for establishing a fluidic and mechanical connection in a fluid tight way. In view of the considerable length of a sample separation unit, its lever action may be highly efficient.

In an embodiment, the second fluid connector is configured for being fluidically coupled with the second fluid interface of the sample separation unit in a sealed, in particular high pressure resistant, way. As mentioned above, the second fluid connector may be arranged downstream of the sample separation unit. Furthermore, the second fluid connector may be arranged upstream of a detector for detecting separated fractions of the fluidic sample. Although a significant pressure drop may occur along the sample separation unit (such as a chromatographic separation column), the pressure at the second fluid connector to may still be significantly above ambient pressure, for instance in a range from 20 bar to 30 bar. To avoid leakage between the second fluid interface and the second fluid connector, creation of a high-pressure resistant sealing between the second fluid interface of the sample separation unit and the second fluid connector of the mounting device may be advantageous.

In an embodiment, the mounting device comprises a second sealing mechanism for sealing the second fluid connector with the second fluid interface. Such a second sealing mechanism may be operated or actuated by a user for establishing a fluid tight connection at the outlet of the sample separation unit.

In an embodiment, the second sealing mechanism comprises a sealing lever. Actuating a sealing lever is an intuitive and simple way for a user of sealing the second fluid connector at the second fluid interface of the sample separation unit. However, other mechanical solutions for the sealing mechanism are possible, such as a sealing button which may be pressed by the user for sealing the second fluid connector.

In an embodiment, the sealing lever has a second sealing eccentric configured for sealing the second fluid connector with the second fluid interface by turning the sealing lever. Advantageously, merely pivoting or turning a sealing lever with an eccentric may trigger a fluid tight sealing force disabling leakage of a fluid (such as a liquid or a gas) at a position between the second fluid interface of the sample separation unit and the second fluid connector. Descriptively speaking, a thick portion of the second sealing eccentric may press the second fluid connector and the second fluid interface of the sample separation unit together when the user actuates the sealing lever.

In an embodiment, the mounting device is configured so that the second sealing mechanism is only operable, in particular a sealing lever is only turnable, after having previously operated the fixing mechanism, in particular after having previously turned a fixing lever. For this purpose, sealing lever and fixing lever may be embodied as mechanically coupled double lever member. It may be highly preferred that the second fluid connector is already at a defined fixed position facing the second fluid interface of the sample separation unit when a fluid tight or even high-pressure resistant coupling is established in between. In order to fulfil this condition, the second fluid connector may be firstly fixed before a pressure robust fluid connection is established between the second fluid connector and the second fluid interface by intensifying a connection force beyond a fixing level up to a final sealing pressure. Hence, actuation of the sealing lever may be mechanically disabled (for instance by a lock or blockage) until the fixing lever has been actuated for fixing the second fluid connector. It is for instance possible to embody sealing lever and fixing lever as double lever requiring two actions by a user. It is however also possible to embody sealing lever and fixing lever as one common mechanism which only requires one user action to accomplish fixing and then sealing.

Preferably, the first fluid connector and the swivel mechanism are longitudinally fixed, and the second fluid connector is longitudinally displaceable. This may allow to configure the first fluid connector in a mechanically simple way, since the first fluid connector only needs to be constructed for being swivelled, but not for being longitudinally displaced. Correspondingly, the second fluid connector may only need to be constructed to be longitudinally displaceable, for instance slidable along a rail. However, there is no need to provide the second fluid connector with a swivelling function, so that the construction can be kept simple.

In an embodiment, the mounting device is configured for toollessly mounting of the sample separation unit at the sample separation apparatus. Thus, a user may assemble and disassemble a sample separation unit at the mounting device without any tools, merely by hand. Hence, handling the sample separation unit at the mounting device is very simple and can be carried out in an intuitive way also by a user without specific skills.

In an embodiment, the alignment orientation corresponds to an orientation of the mounted sample separation unit during separation of a fluidic sample by the sample separation unit. Thus, the alignment orientation may correspond to an analysis orientation or a sample separation orientation of the first fluid connector and the sample separation unit mounted thereon.

In an embodiment, an angle between the mounting orientation and the alignment orientation is not more than 180°, in particular is in a range from 45° and 90°. By allowing a swivelling angle of up to 180°, it may be possible so apply a sufficiently large lever force for creating a fluid tight sealed connection between first fluid connector and the sample separation unit, even when the latter—functioning as sealing lever—is relatively short. However, a swivelling angle in a range from 45° to 90° may be preferred, since this may allow a user to start at an anatomically convenient angular position for mounting the sample separation unit on the first fluid connector. However, it may be possible in other embodiments to select a swivelling angle larger than 180°, for instance 270°.

In an embodiment, the sample separation apparatus comprises an interface adapter connecting at least one of the first fluid interface and the second fluid interface of the sample separation unit with a respective one of the first fluid connector and the second fluid connector of the mounting device. For instance, such an interface adapter may be a male-to-female adapter, a female-to-female adapter, or a male-to-male adapter. Such an interface adapter, in particular to be connected between second fluid interface and second fluid connector, may allow to use essentially any sample separation unit with a universal mounting device. Generally, different connections between a respective fluid connector and a respective fluid interface may be possible, including cone-in-cone connections and cone-in-swage connections.

In an embodiment, the method comprises turning (such as screwing) the sample separation unit onto the first fluid connector in the mounting orientation to thereby couple the first fluid connector mechanically and fluidically with the first fluid interface. For instance, the sample separation unit may firstly be screwed on the first fluid connector for creating a mechanical connection. By swivelling the screwed-on sample separation unit into the alignment orientation, a fluid tight connection between first fluid connector and sample separation unit may be formed.

In an embodiment, swivelling from the mounting orientation to the alignment orientation comprises swivelling the sample separation unit into an upright orientation. Hence, the sample separation unit may be oriented in a vertical position for a sample separation or analysis. However, it may be alternatively also possible to swivel the sample separation unit into a horizontal or even into a slanted orientation for separating a fluidic sample.

In an embodiment, the mounting device may comprise a preheating device (in particular directly) upstream of the first fluid connector for preheating the fluidic sample before reaching the sample separation unit. Such a preheating unit may make it possible to bring the fluidic sample directly before its separation in the sample separation unit to an elevated (for instance target) temperature in order to create defined or favorable separation conditions. If such a preheating device is arranged directly adjacent to the first fluid connector, undesirable cooling phenomena between preheating and separation can be avoided or at least strongly suppressed.

The sample separation unit may be filled with a separating material. Such a separating material which may also be denoted as a stationary phase may be any material which allows an adjustable degree of interaction with a sample fluid so as to be capable of separating different components of such a sample fluid. The separating material may be a liquid chromatography column filling material or packing material comprising at least one of the group consisting of polystyrene, zeolite, polyvinylalcohol, polytetrafluoroethylene, glass, polymeric powder, silicon dioxide, and silica gel, or any of above with chemically modified (coated, capped etc) surface. However, any packing material can be used which has material properties allowing an analyte passing through this material to be separated into different components, for instance due to different kinds of interactions or affinities between the packing material and fractions of the analyte.

At least a part of the sample separation unit may be filled with a fluid separating material, wherein the fluid separating material may comprise beads having a size in the range of essentially 1 µm to essentially 50 µm. Thus, these beads may be small particles which may be filled inside the separation section of the microfluidic device. The beads may have pores having a size in the range of essentially 0.01 µm to essentially 0.2 µm. The fluidic sample may be passed through the pores, wherein an interaction may occur between the fluidic sample and the pores.

The sample separation unit may be a chromatographic column for separating components of the fluidic sample. Therefore, exemplary embodiments may be particularly implemented in the context of a liquid chromatography apparatus.

The sample separation apparatus may be configured to conduct a liquid mobile phase through the sample separation unit. As an alternative to a liquid mobile phase, a gaseous mobile phase or a mobile phase including solid particles may be processed using the sample separation apparatus. Also materials being mixtures of different phases (solid, liquid, gaseous) may be processed using exemplary embodiments. The sample separation apparatus may be configured to conduct the mobile phase through the system with a high pressure, particularly of at least 600 bar, more particularly of at least 1200 bar.

The sample separation apparatus may be configured as a microfluidic device. The term "microfluidic device" may particularly denote a sample separation apparatus as described herein which allows to convey fluid through microchannels having a dimension in the order of magnitude of less than 500 µm, particularly less than 200 µm, more particularly less than 100 µm or less than 50 µm or less.

Exemplary embodiments of the sample separation apparatus may be implemented with a sample injector which may take up a sample fluid from a fluid container and may inject such a sample fluid in a conduit for supply to a separation column. During this procedure, the sample fluid may be compressed from, for instance, normal pressure to a higher pressure of, for instance several hundred bars or even 1000 bar and more. An autosampler may automatically inject a sample fluid from the vial into a sample loop. A tip or needle of the autosampler may dip into a fluid container, may suck fluid into the capillary and may then drive back into a seat to then, for instance via a switchable fluidic valve, inject the sample fluid towards a sample separation section of the liquid chromatography apparatus.

The sample separation apparatus may be configured to analyze at least one physical, chemical and/or biological parameter of at least one component of the sample fluid in the mobile phase. The term "physical parameter" may particularly denote a size or a temperature of the fluid. The term "chemical parameter" may particularly denote a concentration of a fraction of the analyte, an affinity parameter, or the like. The term "biological parameter" may particularly denote a concentration of a protein, a gene or the like in a biochemical solution, a biological activity of a component, etc.

The sample separation apparatus may be implemented in different technical environments, like a sensor device, a test device, a device for chemical, biological and/or pharmaceutical analysis, a capillary electrophoresis device, a liquid chromatography device, a gas chromatography device, an electronic measurement device, or a mass spectroscopy device. Particularly, the sample separation apparatus may be a High Performance Liquid Chromatography (HPLC) device by which different fractions of an analyte may be separated, examined and analyzed.

An embodiment of the present invention comprises a sample separation apparatus configured for separating compounds of a sample fluid in a mobile phase. The sample separation apparatus comprises a mobile phase drive, such as a pumping system, configured to drive the mobile phase through the sample separation apparatus. A sample separation unit, which can be a chromatographic column, is provided for separating compounds of the sample fluid in the mobile phase. The sample separation apparatus may further comprise a sample injector configured to introduce the sample fluid into the mobile phase, a detector configured to detect separated compounds of the sample fluid, a collector configured to collect separated compounds of the sample fluid, a data processing unit configured to process data received from the fluid separation system, and/or a degassing apparatus for degassing the mobile phase.

Embodiments may be implemented in conventionally available HPLC systems, such as the analytical Agilent 1290 Infinity II LC system or the Agilent 1290 Infinity II Preparative LC/MSD system (both provided by the applicant Agilent Technologies—see www.agilent.com).

One embodiment comprises a pumping apparatus having a piston for reciprocation in a pump working chamber to compress liquid in the pump working chamber to a high pressure at which compressibility of the liquid becomes noticeable. One embodiment comprises two pumping apparatuses coupled either in a serial or parallel manner.

The mobile phase (or eluent) can be either a pure solvent or a mixture of different solvents. It can be chosen for instance to minimize the retention of the compounds of interest and/or the amount of mobile phase to run the chromatography. The mobile phase can also been chosen so that the different compounds can be separated effectively. The mobile phase may comprise an organic solvent like for instance methanol or acetonitrile, often diluted with water.

For gradient operation water and organic solvent are delivered in separate bottles, from which the gradient pump delivers a programmed blend to the system. Other commonly used solvents may be isopropanol, THF, hexane, ethanol and/or any combination thereof or any combination of these with aforementioned solvents.

The sample fluid may comprise any type of process liquid, natural sample like juice, body fluids like plasma or it may be the result of a reaction like from a fermentation broth.

The fluid is preferably a liquid but may also be or comprise a gas and/or a supercritical fluid (as for instance used in supercritical fluid chromatography—SFC).

BRIEF DESCRIPTION OF DRAWINGS

Other objects and many of the attendant advantages of embodiments of the present invention will be readily appreciated and become better understood by reference to the following more detailed description of embodiments in connection with the accompanying drawings. Features that are substantially or functionally equal or similar will be referred to by the same reference signs.

The illustration in the drawings is schematic.

DETAILED DESCRIPTION

Before, referring to the figures, exemplary embodiments will be explained in further detail, some basic considerations will be explained based on which exemplary embodiments have been developed.

An exemplary embodiment of the invention provides a mounting device supporting a user during assembly of a sample separation unit (such as a chromatographic separation column) in a sample separation apparatus, more precisely in a column oven of a sample separation apparatus. After mounting a first fluid interface of the sample separation unit at a first fluid connector of the mounting device in a mounting orientation, the first fluid connector together with the sample separation unit is swiveled or pivoted into an alignment orientation in which the sample separation unit remains during a subsequent sample separation or analysis.

For instance, the sample separation unit may be mounted at a sidewall of a column oven. The sample separation unit may be screwed on the first fluid connector which may be embodied as a fitting. The in particular column-shaped sample separation unit may then be used as a lever and may be gripped and swiveled manually by a user into its alignment orientation. This tilting operation may tighten, tension or strain an eccentric (or excentre), whereby a high-pressure connection may be formed between the first fluid connector and the first fluid interface of the sample separation unit. A first capillary may be pre-connected to the first fluid connector, and a second capillary may be pre-connected to the second fluid connector. Handling of capillaries by a user may therefore be dispensable.

More specifically, an exemplary embodiment of the invention provides a mounting device for enabling a combined fixation and connection of the sample separation unit (such as a separation column) to the fluidic path along which the actual sample separation occurs.

Conventionally, columns used for liquid chromatography are connected to the fluidic path with the help of simple, wrench-driven fittings (for instance swage fittings) or quick-connect, tool free fittings. Sometimes these fittings include springs to push the capillary forward within the fitting to avoid dead volume (so-called spring loaded fittings). However, wrench driven tools are tedious to use (for example often require the use of three hands). Moreover, the dead volume is hard to control. Such conventional tools are prone to over-tightening, often causing damage to the capillary and the fitting. Also a port and/or the sample separation unit may be deteriorated or even damaged by conventionally necessary tools, for instance by tightening a fitting in an excessive way. Once the sample separation unit (such as a column for liquid chromatography) is connected to two capillaries with the help of two fittings, the sample separation unit is positioned inside the column oven, using clamp-like or other column holders. Manufacturers of chromatography column ovens have developed their own type of column holders. These holders can be misplaced easily, and the handling requires several additional actions to be taken by a user. Often, the column is not held securely inside the holders, which is especially annoying if more than two columns are used. This can also harm the chromatographic analysis results. Moreover, a conventional way of installing a column in a liquid chromatography oven may require the user to connect up to 16 capillaries (if the oven has eight positions) or four capillaries (if the oven has two positions). This is cumbersome for a user and requires specific skills.

In order to overcome at least part of the above-mentioned and/or other conventional shortcomings, an exemplary embodiment of the invention provides a mounting device for a combined fixation and tool free connection of a sample separation unit (such as a chromatographic separation column) to the fluidic path. Such a mounting device may form part of a column oven of a liquid chromatography separation apparatus. By using a tool-free fitting in a mounting device according to an exemplary embodiment of the invention, users may reliably avoid over-tightening, so that the tool-free fitting may have a longer lifetime. Using a mounting device according to an exemplary embodiment of the invention may reduce the effort and needed skills of a user for mounting or changing a sample separation unit of a sample separation apparatus. Advantageously, such a task may be executed with less workflow processes. No tools may be required, the mounting process may involve less errors and may be carried out faster. In particular, quickly operable fittings (which may be spring loaded) may be implemented. The dead volume may be reduced when connecting a sample separation unit by a mounting device according to an exemplary embodiment of the invention. Advantageously, a user does not need to worry about tightness of the connection, since a preferred embodiment may enable the formation of a high-pressure tight or sealed connection by merely swivelling a sample separation unit together with a first fluid connector on which the sample separation unit has been pre-assembled. As a result, an error risk and/or a leak rate may be decreased. No tools may be required for operating such a mounting device.

Advantageously, an interaction principle of column insertion with a mounting device according to an exemplary embodiment of the invention may be as follows: A spring-loaded combined mounting device for column fixation and connection of the column to the fluidic path may allow the user to install the column with only four workflow processes:

1. Connect the sample separation unit to a first fluid connector.
2. Move the sample separation unit into a correct orientation or position by swivelling. Preferably but not necessarily, this movement may cause a simultaneous tightening of the connection of the sample separation unit to the first fluid connector.
3. Adapt the position of a second fluid connector to the length of the sample separation unit (in particular a column length), in particular by moving the second fluid connector (in particular manually or in an automated way) towards the second fluid interface of the sample separation unit.
4. Tighten or fluidically connect the second fluid connector at the sample separation unit for example manually (for instance by turning a sealing lever) so that the sample separation unit is under sufficient pressure for a subsequent chromatographic analysis (which may involve a high-pressure of for instance 1200 bar or more).

An exemplary embodiment of the invention accomplishes an inserting and fluidically coupling of a sample separation unit such as a chromatographic column. When executing a process of inserting the sample separation unit between two (for example conical) fluid connectors, it may be possible to slide the fluid connectors against each other for instance on a rail. In particular, one of the (for example conical) fluid connectors or couplers may be axially movable along a rail and may be fixable at a target position (in particular when having reached a corresponding fluid interface of the sample separation unit), for instance with a lever mechanism. The other (for example conical) fluid connector or coupler may be fixedly arranged on the rail but may have a swivelling mechanism allowing to be rotated or swivelled around a rotational axis. This allows to slightly swivel the first fluid connector or coupler in order to provide a more convenient angle for inserting the sample separation unit into the first fluid connector. Once the sample separation unit is inserted into the first fluid connector or coupler, both can be swivelled back into an axial position, and the (in particular upper) second fluid connector may be moved against the (in particular upper) connection point of the sample separation unit, thus fluidically coupling the sample separation unit from both axial sides. Optionally but preferably, the position of the upper second fluid connector can be fixed, for instance by usage of a lever mechanism. An advantageous gist of an exemplary embodiment of the present application is the provision of a swivel mechanism for improving usability and the opportunity of establishing a sealed high-pressure tight coupling by a mere operation of the swivelling mechanism. Thus, an exemplary embodiment may accomplish a column coupling mechanism in which one side of the column coupling can be swiveled to simplify insertion of the column. Pivoting one side of the column may thus be carried out for easier insertion of the column.

According to an exemplary embodiment of the invention, a mechanism for establishing a fluidic coupling of a chromatographic column may be provided by (1) inserting a column end into a pivoting fluid connector (wherein the pivot mechanism may be attached to a static rail), (2) folding of the column, so that it is positioned substantially parallel to this rail, (3) pushing a further fluid connector along the rail, so that it is fluidically coupled with the other end of the column, (4) shifting a lever for locking the slid fluid connector on the rail, and (5) shifting another, eccentrically mounted lever to accomplish two-sided high-pressure coupling.

In embodiments, it may be possible to provide a column identification tag reader in order to carry out the connection automatically. A connection to a solvent pre-heater may be included in yet another embodiment. Furthermore, a filter for filtering fluid may be included into the mounting device.

Figure 1:
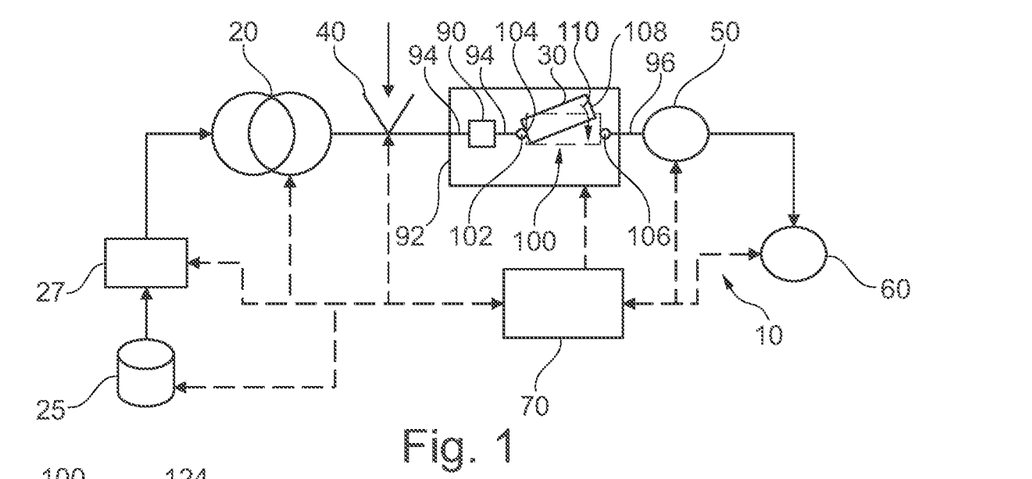
FIG. 1 shows a sample separation device in accordance with embodiments of the present invention, particularly used in high performance liquid chromatography (HPLC).

Referring now in greater detail to the drawings, FIG. 1 depicts a general schematic of a liquid chromatography separation system as an example for a sample separation apparatus 10. A pump as an example for a fluid drive unit 20 receives a mobile phase from a solvent supply 25, typically via a degasser 27, which degases and thus reduces the amount of dissolved gases in the mobile phase. The fluid drive unit 20—such as a high-pressure pump—drives the mobile phase through a sample separation unit 30 (such as a chromatographic column) comprising a stationary phase. A sampling unit or injector 40 can be provided between the fluid drive unit 20 and the sample separation unit 30 in order to subject or add (often referred to as sample introduction) a sample fluid into the mobile phase. The stationary phase of the sample separation unit 30 is configured for separating compounds of the sample liquid. A detector 50 is provided for detecting separated compounds of the sample fluid. A fractionating unit 60 can be provided for outputting separated compounds of sample fluid.

While the mobile phase can be comprised of one solvent only, it may also be mixed from plural solvents. Such mixing may be a low pressure mixing and provided upstream of the fluid drive unit 20, so that the fluid drive unit 20 already receives and pumps the mixed solvents as the mobile phase. Alternatively, the fluid drive unit 20 may be comprised of plural individual pumping units, with plural of the pumping units each receiving and pumping a different solvent or mixture, so that the mixing of the mobile phase (as received by the sample separation unit 30) occurs at high pressure and downstream of the fluid drive unit 20 (or as part thereof). The composition (mixture) of the mobile phase may be kept constant over time, the so-called isocratic mode, or varied over time, the so-called gradient mode.

A control unit 70, which can be a conventional PC or workstation, may be coupled (as indicated by dashed arrows) to one or more of the devices in the sample separation apparatus 10 in order to receive information and/or control operation. For example, the control unit 70 may control operation of the fluid drive unit 20 (for instance setting control parameters) and receive therefrom information regarding the actual working conditions (such as output pressure, flow rate, etc., at an outlet of the pump). The control unit 70 may also control operation of the solvent supply 25 (for instance setting the solvent/s or solvent mixture to be supplied) and/or the degasser 27 (for instance setting control parameters such as vacuum level) and may receive therefrom information regarding the actual working conditions (such as solvent composition supplied over time, flow rate, vacuum level, etc.). The control unit 70 may further control operation of the sampling unit or injector 40 (for instance controlling sample injection or synchronization of sample injection with operating conditions of the fluid drive unit 20). The sample separation unit 30 may also be controlled by the control unit 70 (for instance selecting a specific flow path or column, setting operation temperature, etc.), and send—in return—information (for instance operating conditions) to the control unit 70. Accordingly, the detector 50 may be controlled by the control unit 70 (for instance with respect to spectral or wavelength settings, setting time constants, start/stop data acquisition), and send information (for instance about the detected sample compounds) to the control unit 70. The control unit 70 may also control operation of the fractionating unit 60 (for instance in conjunction with data received from the detector 50) and provide data back.

In FIG. 1 it can also be seen that the sample separation unit 30 (such as a chromatographic separation column) is arranged together with a preheating device 90 inside a temperature control chamber 92 (such as a column oven) and can be heated there using a heat source (not shown). In this way, the sample separation unit 30 can be brought to a target or predetermined temperature which may be desired for a sample separation process.

FIG. 1 also shows schematically a mounting device 100 according to an exemplary embodiment of the invention for assembling and disassembling the sample separation unit 30 in the sample separation apparatus 10. The mounting device 100 serves for mounting sample separation unit 30 at sample separation apparatus 10 manually by a user without the need of using tools. For this purpose, the mounting device 100 comprises a first fluid connector 102 which is pre-connected to an inlet capillary 94 and which may be embodied as a male-type first fitting. First fluid connector 102 is configured for being mechanically and fluidically coupled with a first fluid interface 104, such as a female-type column inlet, of the sample separation unit 30. Furthermore, a second fluid connector 106, which may be embodied as a male-type second fitting, may be pre-connected to an outlet capillary 96 and may be configured for being mechanically and fluidically coupled with a second fluid interface 108, such as a female-type column outlet, of the sample separation unit 30. In other embodiments, a sample separation unit 30 with at least one male-type interface 104 and/or 108 may be implemented as well. More generally, each fluid interface 104, 108 may provide a fluid connection, in particular but not limited to a female-type column inlet or outlet. As indicated schematically in FIG. 1, the mounting device 100 may also comprise a swivel mechanism 110 configured for swivelling the first fluid connector 102 between a mounting orientation (illustrated with solid lines in FIG. 1) for mounting the first fluid interface 104 of the sample separation unit 30 at the first fluid connector 102, and an alignment orientation (shown with dotted lines in FIG. 1) for aligning the second fluid interface 108 of the mounted sample separation unit 30 with the second fluid connector 106. When brought in the alignment orientation, it is subsequently possible to couple the second fluid interface 108 with the second fluid connector 106 for closing the flow path from the fluid drive unit 20 and the injector 40 through the temperature control chamber 92 up to detector 50. Mounting the sample separation unit 30 by a user in the mounting orientation may be user convenient, since the sample separation unit 30 may face the user during the mounting process. Swivelling, pivoting or tilting the sample separation unit 30 into an analysis or sample separation orientation in which a subsequent sample separation or analysis will be carried out may optionally, but highly advantageously, establish a high-pressure robust fluidic connection between the first fluid connector 102 and the first fluid interface 104.

Figure 7:
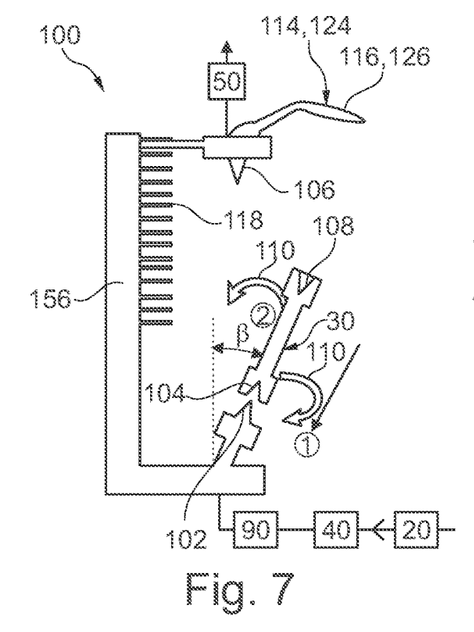
FIG. 7 is a schematic illustration of a method of mounting a sample separation unit at a sample separation apparatus according to an exemplary embodiment in one state during operation.
Figure 8:
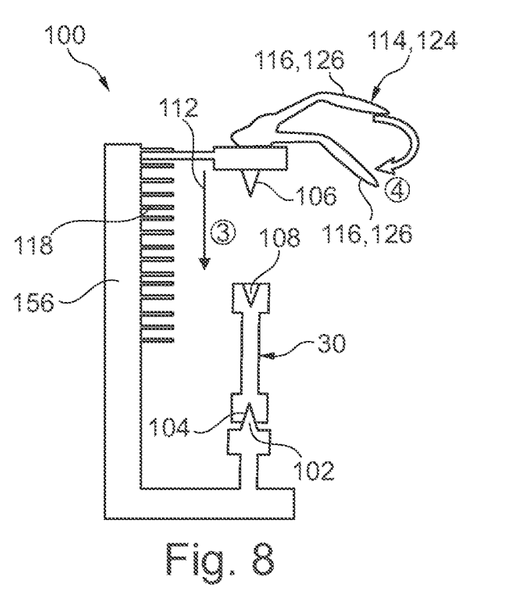
FIG. 8 is a schematic illustration of the method shown in FIG. 7 in a different state during operation.
Figure 9:
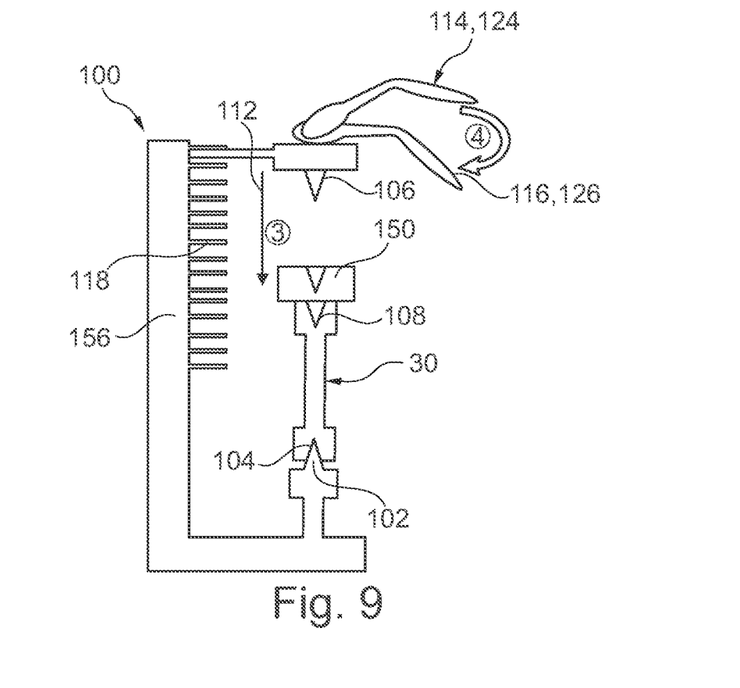
FIG. 9 is another schematic illustration of a method of mounting a sample separation unit at a sample separation apparatus according to another exemplary embodiment in two different states during operation using another sample separation unit than in FIG. 7 and FIG. 8.

Referring to FIG. 2 to FIG. 6, details about the construction of a mounting device 100 according to an exemplary embodiment will be explained. Referring to FIG. 7 to FIG. 9, methods of operating such a mounting device 100 according to an exemplary embodiment will be explained in further detail.

Figure 2:
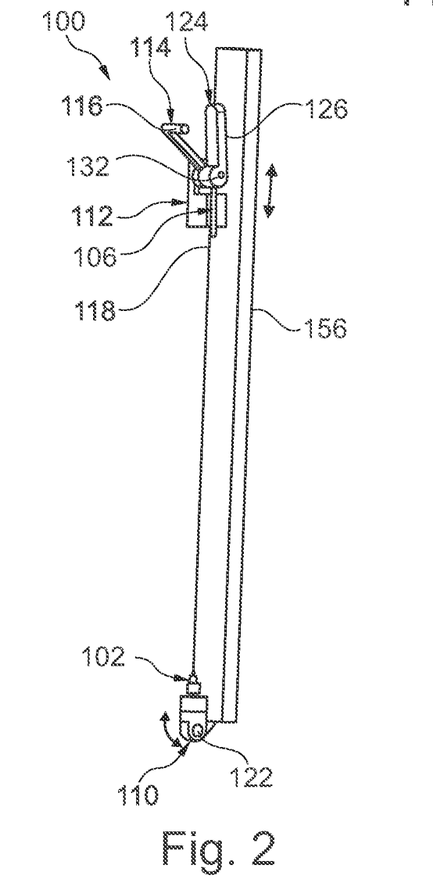
FIG. 2 shows a three-dimensional view of a mounting device for mounting a sample separation unit in a sample separation apparatus according to an exemplary embodiment.
Figure 3:
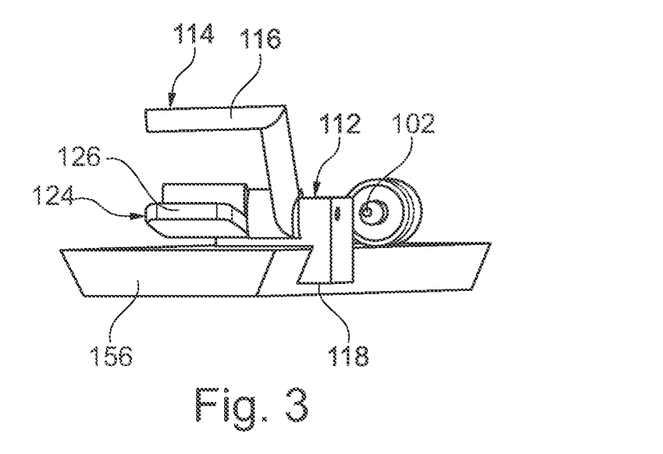
FIG. 3 shows a top view of the mounting device illustrated in FIG. 2.
Figure 4:
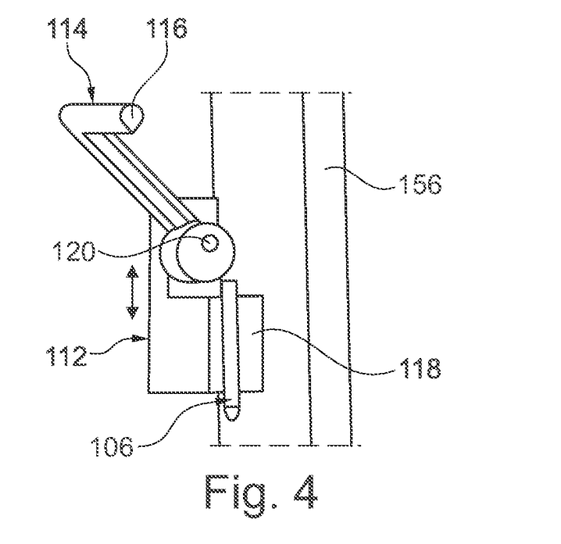
FIG. 4 shows a detail of a slider unit and a corresponding fixing mechanism of the mounting device illustrated in FIG. 2.
Figure 5:
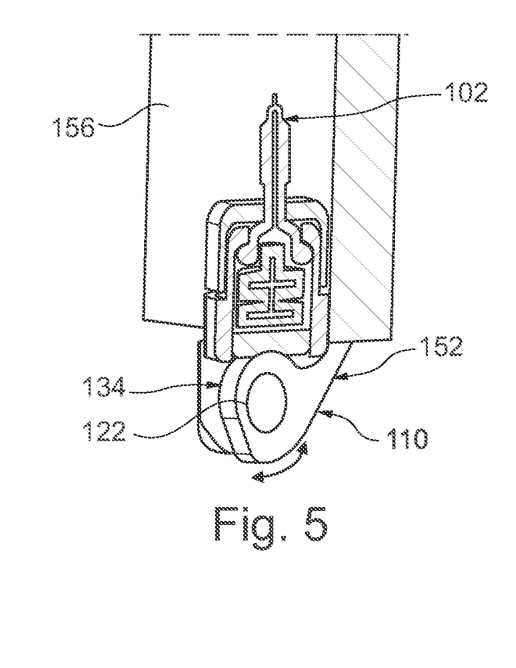
FIG. 5 is a detail showing a swivel mechanism of the mounting device illustrated in FIG. 2.
Figure 6:
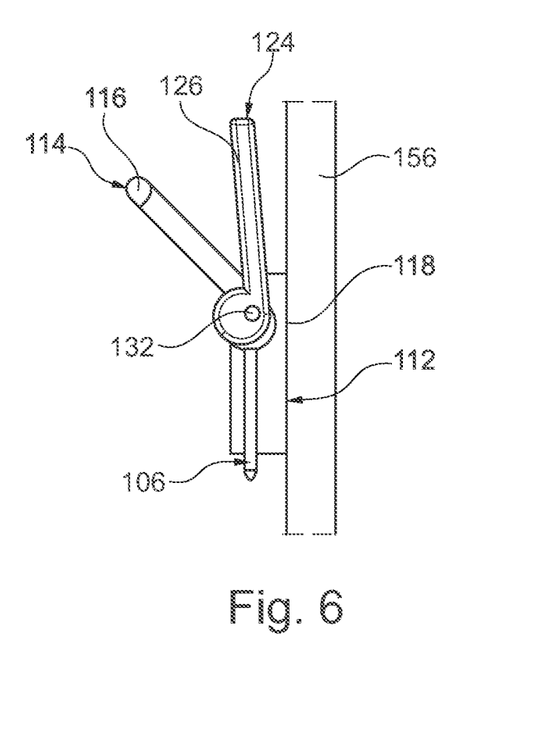
FIG. 6 shows a further detail of the mounting device illustrated in FIG. 2, illustrating a double-lever mechanism.

FIG. 2 to FIG. 6 are schematic illustrations of a mounting device 100 for mounting a sample separation unit 30 in a sample separation apparatus 10 according to an exemplary embodiment. FIG. 2 shows a three-dimensional view of the mounting device 100 (without sample separation unit 30). FIG. 3 illustrates the mounting device 100 in a view from above. FIG. 4 shows a detail of a slider unit 112 and a corresponding fixing mechanism 114 for moving and fixing a second fluid connector 106 of the mounting device 100. FIG. 5 is a detail showing a swivel mechanism 110 for swivelling a first fluid connector 102 of the mounting device 100. FIG. 6 shows a further detail of mounting device 100 illustrating a double-lever mechanism for fixing the second fluid connector 106 and creating a high-pressure sealing between the second fluid connector 106 and a second fluid interface 108 of a sample separation unit 30.

The mounting device 100 according to FIG. 2 to FIG. 6 serves for mounting a column-shaped sample separation unit 30 (compare FIG. 7 to FIG. 9) at a sample separation apparatus 10 such as the one shown in FIG. 1.

For this purpose and referring predominantly to FIG. 2 and FIG. 5, the mounting device 100 comprises a bottom-sided first fluid connector 102 embodied as a male-type fitting and configured for being mechanically and fluidically coupled with a female-type first fluid interface 104 (compare FIG. 7) at an inlet of the sample separation unit 30. As shown, the first fluid connector 102 is a conical fluid connector for insertion into a correspondingly shaped recess of the first fluid interface 104 of the sample separation unit 30.

As best seen in FIG. 2, FIG. 4 and FIG. 6, a top-sided second fluid connector 106 embodied as a further male-type fitting is configured for being mechanically and fluidically coupled with a second fluid interface 108 (compare FIG. 7) at an outlet of the sample separation unit 30. In the shown embodiment, the second fluid connector 106 is a conical fluid connector for insertion into an accordingly shaped and dimensioned recess of the second fluid interface 108 of the sample separation unit 30.

Beyond this, a swivel mechanism 110 is provided which is illustrated in FIG. 2 and FIG. 5. As shown in FIG. 2 and FIG. 5, the swivel mechanism 110 comprises a hinge 122. Said swivel mechanism 110 is configured for swivelling the first fluid connector 102 between a slanted mounting orientation for mounting the first fluid interface 104 of the sample separation unit 30 at the first fluid connector 102 in a user convenient way. A slanted mounting orientation is not shown in FIG. 2 to FIG. 6, but in FIG. 7. Moreover, a user may actuate the swivel mechanism 110 to transfer the first fluid connector 102 into an upright alignment orientation, as illustrated, for aligning the second fluid interface 108 of the mounted sample separation unit 30 with the second fluid connector 106. When brought in the alignment orientation, the mounting device 100 together with a mounted sample separation unit 30 are prepared for subsequently coupling the second fluid interface 108 with the second fluid connector 106 by sliding the second fluid connector 106 downwardly until it abuts against the second fluid interface 108 of the sample separation unit 30. In the upright alignment orientation (see FIG. 2 and FIG. 8), both the first fluid connector 102 and the sample separation unit 30 are in their final orientation and position for carrying out the sample separation or analysis.

As indicated by double arrows in FIG. 2 and FIG. 4, the second fluid connector 106 is configured to be longitudinally movable in a vertical direction towards but not up to the first fluid connector 102 for coupling the second fluid interface 108 of the sample separation unit 30 with the second fluid connector 106 in the alignment orientation. In the slanted mounting orientation, however, such a mechanical and fluidic coupling is not possible. The first fluid connector 106 is not longitudinally movable in the illustrated embodiment and is thus longitudinally fixed. Descriptively speaking, the first fluid connector 102 is swivellable but not longitudinally movable, whereas the second fluid connector 106 is not swivellable but longitudinally movable. Thus, the first fluid connector 102 and the swivel mechanism 110 are longitudinally fixed and the second fluid connector 106 is longitudinally displaceable. More specifically, the movable second fluid connector 106 is connected with a slider unit 112 mounted on a support 156 (such as a vertical wall of a column oven as an embodiment of temperature control chamber 92 according to FIG. 1) for being slidably movable along a vertical longitudinal sliding direction together with the second fluid connector 106 along a rail 118. While the alignment orientation is parallel to the longitudinal sliding direction, the mounting orientation is slanted with respect to the longitudinal sliding direction. By sliding the second fluid connector 106 to a desired vertical position along the rail 118 (which is here embodied as a continuous rail) by the slider unit 112, the mounting device 100 may be adjusted to different lengths of sample separation units 30. Hence, the universal mounting device 100 is compatible for use with sample separation units 30 over a large length range, for instance from 80 mm to 300 mm.

Now referring to FIG. 2, FIG. 3, FIG. 4, and FIG. 6, the mounting device 100 comprises a fixing mechanism 114 for fixing the longitudinally movable second fluid connector 106 at a defined vertical position, after adjusting its vertical position by sliding it vertically using slider unit 112 along rail 118. Fixing may be accomplished by operating the fixing mechanism 114. For this purpose, the fixing mechanism 114 comprises a fixing lever 116 which is operable manually by a user. As best seen in FIG. 4, the fixing lever 116 has an eccentric 120 which is functionally connected with the second fluid connector 106 and which is configured for fixing the second fluid connector 106 by turning the fixing lever 116.

Highly advantageously, the first fluid connector 102 is configured for being fluidically coupled with the first fluid interface 104 of the sample separation unit 30 in a sealed and high pressure resistant way upon swivelling the sample separation unit 30 on the first fluid connector 102 from the mounting orientation to the alignment orientation. For this purpose, the mounting device 100 may be equipped with a first sealing mechanism 152 having an eccentric 134. The eccentric 134 may be configured for being swivelled by swivelling the first fluid connector 102 together with the mounted sample separation unit 30 from the mounting orientation to the alignment orientation. Thereby, the first fluid connector 102 is fluidically coupled with the first fluid interface 104 of the sample separation unit 30 in the sealed and high-pressure resistant way. Hence, leakage at the fluidic connection between the first fluid interface 104 of the sample separation unit 30 and the first fluid connector 102 may be reliably prevented even at high pressure values, such as 1200 bar or more. Highly advantageously, the high-pressure resistant sealing can be created by the mere action of swivelling the column-shaped sample separation unit 30 when mounted on the first fluid connector 102 from the mounting orientation to the alignment orientation. During this swivelling, the sample separation unit 30 functions as a highly effective sealing lever in view of the considerable length of the sample suppression unit 30 and its consequently high lever force. In other words, swivelling the first fluid connector 102 with the sample separation unit 30 from the mounting orientation to the alignment orientation triggers formation of a sealed and high pressure resistant connection between the first fluid interface 104 and the first fluid connector 102 by the eccentric 134 cooperating with the sample separation unit 30. No additional hardware is necessary for establishing the high-pressure resistant sealing connection at the bottom side. Since the first fluid connector 102 is fluidically connected with the fluid drive unit 20 and the injector 40 according to FIG. 1 and thus exposed to the high pressure provided by the fluid drive unit 20, a reliable high-pressure tight sealing is of utmost advantage at the transition between the first fluid connector 102 and the first fluid interface 104 of the sample separation unit 30.

Now referring to the top side, also the second fluid connector 106 may the configured for being fluidically coupled with the second fluid interface 108 of the sample separation unit 30 in a sealed and preferably high-pressure resistant way. The top-sided second fluid connector 106 may be connected to the detector 50 according to FIG. 1. Although a major portion of the high pressure created by the fluid drive unit 20 drops along the sample separation unit 30, an overpressure of for instance 20 bar to 30 bar may still be present at the second fluid connector 106. In order to deal with such an overpressure, a second sealing mechanism 124 may be provided for sealing the second fluid connector 106 with the second fluid interface 108 even in the event of a significant overpressure at this transition. As shown in FIG. 2, FIG. 3 and FIG. 6, the second sealing mechanism 124 comprises a sealing lever 126 which is manually operable by the user. The sealing lever 126 has an eccentric 132 (compare FIG. 6) configured for sealing the second fluid connector 106 with the second fluid interface 108 by turning the sealing lever 126. Turning the sealing lever 126 may put the eccentric 132 under tension and may press the second fluid connector 106 and the second fluid interface 108 of the sample separation unit 30 sealingly together.

However, it may be desired that sealing of the second fluid connector 106 with the second fluid interface 108 is only accomplished after fixing the second fluid connector 106 at a desired vertical position. In order to ensure compliance with this preferred order, the sealing lever 126 and the fixing lever 116 are mechanically and functionally coupled. More specifically, the sealing lever 126 and the fixing lever 116 are coupled so that the sealing lever 126 can only be turned after having previously turned the fixing lever 116. Otherwise, the sealing lever 126 is mechanically blocked by the fixing lever 116.

As described, the entire mounting device 100 is configured for a tool-free mounting of the sample separation unit 30 at the sample separation apparatus 10 manually by the user and without any tools.

Any of the eccentric mechanisms described referring to FIG. 2 to FIG. 6 (see reference signs 120, 132, 134) can be optionally but advantageously biased by a biasing element (such as a spring or magnets) for further strengthening created connections. By taking this measure, the respective lever mechanism can be operated with an additional biasing force.

FIG. 7 and FIG. 8 are schematic illustrations of a method of mounting a sample separation unit 30 at a sample separation apparatus 10 according to an exemplary embodiment in two different states during operation. As shown in FIG. 7, the first fluid connector 102 may be arranged directly downstream of an optional preheater device 90 which is, in turn, arranged downstream of the injector 40 and the fluid drive unit 20 (compare FIG. 1). Thus, the first fluid connector 102 is at high-pressure of for example 1200 bar during sample separation. The majority of this high-pressure drops when mobile phase and fluidic sample flow through sample separation unit 30. At the second fluid connector 106, the pressure can be typically 20 bar to 30 bar during operation of the sample separation apparatus 10. Downstream of the second fluid connector 106, the separated fluidic sample may be detected in a detector 50 (compare FIG. 1). In the following, a process of mounting sample separation unit 30 at mounting device 100 for establishing a quick connect fitting will be explained referring to FIG. 7 and FIG. 8.

FIG. 7 shows a swivel mechanism 110, a first fluid connector 102 and a first fluid interface 104 of a sample separation unit 30 (such as a chromatographic separation column) in a mounting orientation. In the mounting orientation of the first fluid connector 102, a user may mount the first fluid interface 104 of the sample separation unit 30 at the first fluid connector 102. This is indicated with reference sign "1" in FIG. 7. According to this process, the first fluid connector 102 is coupled mechanically and fluidically with the first fluid interface 104 of the sample separation unit 30, but may be not yet high-pressure-sealed. For instance, this process may involve screwing the column in a hand-tight manner on the first fluid connector 102. More generally, a user may turn the sample separation unit 30 onto the first fluid connector 102 in the mounting orientation to thereby couple the first fluid connector 102 mechanically and fluidically with the first fluid interface 104. For fulfilling this task by a user, it may be convenient that the sample separation unit 30 is oriented in a slanted fashion.

As indicated in FIG. 7 with reference sign "2", the process may thereafter comprise swivelling the swivel mechanism 110, the first fluid connector 102 and the sample separation unit 30 from the mounting orientation according to FIG. 7 to an upright alignment orientation for aligning a second fluid interface 108 of the sample separation unit 30 with a second fluid connector 106 of the mounting device 100. Thus, swivelling from the mounting orientation to the alignment orientation may comprise swivelling the sample separation unit 30 into an upright or vertical orientation. The result of this process is shown in FIG. 8. By this swiveling process, it may be simultaneously possible to lock the column-type sample separation unit 30 and tighten the connection through clipping-in the column. During this process, the column functions as a lever. For instance, an angle β between the mounting orientation and the alignment orientation may be 45°. In the alignment orientation, which may also be denoted as analysis orientation, the sample separation unit 30 is already at a position and in an orientation for carrying out a sample separation or analysis. Thus, the alignment orientation corresponds to an orientation of the mounted sample separation unit 30 during separation of a fluidic sample by the sample separation unit 30.

Highly advantageously, the process of swivelling the swivelling mechanism 110, the first fluid connector 102 and the sample separation unit 30 from the mounting orientation to the alignment orientation triggers, without any additional action or measure, simultaneously the formation of a sealed and high pressure tight connection between the first fluid interface 104 and the first fluid connector 102. For example, this can be accomplished by an eccentric mechanism. For instance, this may be done by actuating an eccentric 134 by swivelling the sample separation unit 30 from the mounting orientation to the alignment orientation to thereby fluidically couple the first fluid connector 102 with the first fluid interface 104 of the sample separation unit 30 in a sealed and high pressure resistant way (as described above referring to FIG. 2 to FIG. 6). Thus, creating a high-pressure tight connection at the inlet side of the sample separation unit 30 becomes a simple, quick and failure robust task according to the described exemplary embodiment of the invention. There is neither a necessity to handle a tool for this purpose nor to deal with tiny capillary connections or execute delicate tasks.

Now referring to FIG. 8, when the swivelling mechanism 110, the first fluid connector 102 and the sample separation unit 30 have been transferred in the alignment orientation, it may be possible to couple the second fluid connector 106 mechanically and fluidically with the second fluid interface 108 of the sample separation unit 30.

As indicated with reference sign "3", coupling of the second fluid connector 106 mechanically and fluidically with the second fluid interface 108 in the alignment orientation comprises sliding the second fluid connector 106 onto the second fluid interface 108. This may be accomplished by putting, driving or guiding slider unit 112 down, until second fluid connector 106 reaches the second fluid interface 108 of the sample separation unit 30. For example, slider unit 112 may cooperate with a vertical rail 118 (which is here embodied as an incremental rail).

Furthermore, and as shown by reference sign "4" in FIG. 8, coupling the second fluid connector 106 mechanically and fluidically with the second fluid interface 108 may comprise, after the sliding, spatially fixing the second fluid connector 106 by turning around fixing lever 124 of fixing mechanism 114. Finally, coupling the second fluid connector 106 mechanically and fluidically with the second fluid interface 108 may comprises, after the fixing, sealing the second fluid connector 106 at the second fluid interface 108 by turning around sealing lever 126 of second sealing mechanism 124. As shown, a quick connection with a cone-in-cone geometry may be established according to FIG. 8.

FIG. 9 is another schematic illustration of a method of mounting a sample separation unit 30 at a sample separation apparatus 10 according to another exemplary embodiment using another sample separation unit 30 than in FIG. 7 and FIG. 8.

The embodiment according to FIG. 9 differs from the embodiment according to FIG. 7 and FIG. 8 in particular in that, according to FIG. 9, an interface adapter 150 is provided which is arranged between the second fluid interface 108 of the sample separation unit 30 and the second fluid connector 106 of the mounting device 100. More specifically, the interface adapter 150 connects the second fluid interface 108 of the sample separation unit 30 with the second fluid connector 106 of the mounting device 100 in a scenario, in which the second fluid interface 108 and the second fluid connector 106 and not directly connectable, for instance due to non-matching shapes and/or dimensions. In the shown embodiment, the second fluid connector 106 is a male-type connector with a conically protruding fitting body. The second fluid interface 108 may have a shape which is incompatible with the conically protruding fitting body, for instance since the second fluid interface 108 is of the male-type or is of the female-type with shape and/or dimensions not matching to the conically protruding fitting body of the second fluid connector 106. The interface adapter 150, when interposed between the second fluid interface 108 and the second fluid connector 106 may render the latter two members compatible. Specifically, the interface adapter 150 may have a first mechanical and fluidic side which matches with the second fluid connector 106, and may have a second mechanical and fluidic side which matches with the second fluid interface 108. By providing an appropriate interface adapter 150, mounting device 100 may be rendered more universal by supporting different column types or other sample separation units 30. For instance, if the sample separation unit 30 is a chromatographic separation column which does not support a cone-in-cone fitting, usage of an interface adapter 150 may be advantageous.

It should be noted that the term "comprising" does not exclude other elements or features and the term "a" or "an" does not exclude a plurality. Also, elements described in association with different embodiments may be combined. It should also be noted that reference signs in the claims shall not be construed as limiting the scope of the claims.

The invention claimed is:

1. A mounting device for mounting a sample separation unit configured for separating compounds in a fluidic sample, the mounting device comprising:
   a first fluid connector configured for being mechanically and fluidically coupled with a first fluid interface of the sample separation unit;
   a second fluid connector configured for being mechanically and fluidically coupled with a second fluid interface of the sample separation unit; and
   a swivel mechanism configured to swivel the first fluid connector between a mounting orientation and an alignment orientation, wherein:
   the mounting orientation is configured for mounting the first fluid interface of the sample separation unit at the first fluid connector; and
   the alignment orientation is configured for aligning the second fluid interface of the sample separation unit, mounted at the first fluid connector, with the second fluid connector and for subsequently coupling the second fluid interface with the second fluid connector.

2. The mounting device of claim 1, wherein the first fluid connector is a male-type fluid connector, and/or the second fluid connector is a male-type fluid connector.

3. The mounting device of claim 1, wherein at least one of the first fluid connector and the second fluid connector is configured to be movable towards the respectively other fluid connector for coupling the second fluid interface of the sample separation unit with the second fluid connector in the alignment orientation.

4. The mounting device of claim 3, wherein the at least one movable of the first fluid connector and the second fluid connector is connected with a longitudinal guide unit for being movable in a guided way along a longitudinal motion direction.

5. The mounting device of claim 4, wherein the alignment orientation is parallel to the longitudinal motion direction.

6. The mounting device of claim 4, wherein the mounting orientation is slanted with respect to the longitudinal motion direction.

7. The mounting device of claim 3, comprising a fixing mechanism configured to fix the at least one movable one of the first fluid connector and the second fluid connector by operating the fixing mechanism.

8. The mounting device of claim 7, wherein the fixing mechanism comprises at least one of the group consisting of: a fixing lever; a fixing button; and an automated fixing mechanism.

9. The mounting device of claim 8, wherein the fixing lever comprises an eccentric configured for fixing the at least one movable one of the first fluid connector and the second fluid connector by turning the fixing lever.

10. The mounting device of claim 1, wherein the swivel mechanism comprises a hinge.

11. The mounting device of claim 1, wherein the first fluid connector is configured for being fluidically coupled with the first fluid interface of the sample separation unit in a sealed way by swivelling the sample separation unit from the mounting orientation to the alignment orientation.

12. The mounting device of claim 11, comprising a first sealing mechanism with an eccentric configured for being swivelled by swivelling the sample separation unit from the mounting orientation to the alignment orientation to thereby fluidically couple the first fluid connector with the first fluid interface of the sample separation unit in a sealed way.

13. The mounting device of claim 1, wherein the second fluid connector is configured for being fluidically coupled with the second fluid interface of the sample separation unit in a sealed way.

14. The mounting device of claim 13, comprising one of:
a second sealing mechanism for sealing the second fluid connector with the second fluid interface;
a second sealing mechanism for sealing the second fluid connector with the second fluid interface, wherein the second sealing mechanism comprises a sealing lever;
a second sealing mechanism for sealing the second fluid connector with the second fluid interface, wherein the second sealing mechanism comprises a sealing lever, and wherein the sealing lever comprises an eccentric configured for sealing the second fluid connector with the second fluid interface by turning the sealing lever.

15. The mounting device of claim 14, wherein:
at least one of the first fluid connector and the second fluid connector is configured to be movable towards the respectively other fluid connector for coupling the second fluid interface of the sample separation unit with the second fluid connector in the alignment orientation;
the mounting device comprises a fixing mechanism configured to fix the at least one movable one of the first fluid connector and the second fluid connector by operating the fixing mechanism; and
the mounting device is configured so that the second sealing mechanism is only operable after having previously operated the fixing mechanism.

16. The mounting device of claim 1, comprising at least one of the following features:
wherein the first fluid connector and the swivel mechanism are longitudinally fixed, and the second fluid connector is longitudinally displaceable;
configured so that swivelling the first fluid connector with the sample separation unit from the mounting orientation to the alignment orientation triggers formation of a sealed connection between the first fluid interface and the first fluid connector;
configured for toollessly mounting of the sample separation unit at the sample separation apparatus;
wherein the alignment orientation corresponds to an orientation of the mounted sample separation unit during separation of a fluidic sample by the sample separation unit;
wherein an angle (β) between the mounting orientation and the alignment orientation is not more than 180°;
wherein an angle (β) between the mounting orientation and the alignment orientation is in a range from 45° and 90°;
the mounting orientation is slanted with respect to the alignment orientation.

17. A sample separation apparatus for separating a fluidic sample, the sample separation apparatus comprising:
a fluid drive unit configured for driving a mobile phase and the fluidic sample injected in the mobile phase;
a sample separation unit configured for separating the fluidic sample; and
the mounting device of claim 1 for mounting the sample separation unit at the sample separation apparatus.

18. The sample separation apparatus of claim 17, further comprising at least one of the following features:
the sample separation apparatus comprises an interface adapter connecting at least one of the first fluid interface and the second fluid interface of the sample separation unit on the one hand with a respective one of the first fluid connector and the second fluid connector of the mounting device on the other hand;
a temperature control chamber in which the sample separation unit and at least part of the mounting device are arranged;
a preheating device configured to preheat fluidic sample and/or mobile phase upstream of the sample separation unit;
the sample separation apparatus is configured as a chromatography sample separation device;
the sample separation unit is a chromatographic separation column;
a detector configured to detect the separated fluidic sample;
a fractioner unit configured to collect separated fractions of the fluidic sample;
a control unit configured to control operation of the sample separation apparatus;
a degassing apparatus for degassing at least part of the mobile phase.

19. A method of mounting a sample separation unit configured for separating compounds in a fluidic sample, the method comprising:
mounting a first fluid interface of the sample separation unit at a first fluid connector in a mounting orientation to couple the first fluid connector mechanically and fluidically with the first fluid interface of the sample separation unit;
thereafter swivelling a swivel mechanism from the mounting orientation to an alignment orientation for aligning a second fluid interface of the sample separation unit, mounted at the first fluid connector, with a second fluid connector; and
in the alignment orientation, coupling the second fluid connector mechanically and fluidically with the second fluid interface of the sample separation unit.

20. The method of claim 19, comprising at least one of the following features:
- wherein the method comprises turning the sample separation unit onto the first fluid connector in the mounting orientation to thereby couple the first fluid connector mechanically and fluidically with the first fluid interface;
- wherein swivelling from the mounting orientation to the alignment orientation comprises swivelling the sample separation unit from a slanted orientation into an upright orientation;
- wherein swivelling the sample separation unit from the mounting orientation to the alignment orientation triggers formation of a sealed, in particular high pressure resistant, connection between the first fluid interface and the first fluid connector;
- wherein coupling the second fluid connector mechanically and fluidically with the second fluid interface in the alignment orientation comprises sliding the second fluid connector onto the second fluid interface;
- wherein coupling the second fluid connector mechanically and fluidically with the second fluid interface in the alignment orientation comprises sliding the second fluid connector onto the second fluid interface, and wherein coupling the second fluid connector mechanically and fluidically with the second fluid interface comprises, after the sliding, spatially fixing the second fluid connector;
- wherein coupling the second fluid connector mechanically and fluidically with the second fluid interface in the alignment orientation comprises sliding the second fluid connector onto the second fluid interface, and wherein coupling the second fluid connector mechanically and fluidically with the second fluid interface comprises, after the sliding, spatially fixing the second fluid connector, and wherein coupling the second fluid connector mechanically and fluidically with the second fluid interface comprises, after the fixing, sealing the second fluid connector at the second fluid interface;
- wherein the method comprises fluidically coupling the first fluid connector with the first fluid interface of the sample separation unit in a sealed way by swivelling the sample separation unit from the mounting orientation to the alignment orientation;
- wherein the method comprises fluidically coupling the first fluid connector with the first fluid interface of the sample separation unit in a sealed way by swivelling the sample separation unit from the mounting orientation to the alignment orientation, and wherein the method further comprises actuating an eccentric by swivelling the sample separation unit from the mounting orientation to the alignment orientation to thereby fluidically couple the first fluid connector with the first fluid interface of the sample separation unit in a sealed way.

* * * * *